US008999252B2

(12) United States Patent
Cho et al.

(10) Patent No.: US 8,999,252 B2
(45) Date of Patent: Apr. 7, 2015

(54) EXHAUST GAS CATALYST AND EXHAUST GAS PROCESSING APPARATUS USING SAME

(75) Inventors: Jin Cho, Tochigi-ken (JP); Tomotaka Hirota, Tochigi-ken (JP); Kenji Tanikawa, Tochigi-ken (JP)

(73) Assignee: Johnson Matthey Japan Incorporated, Tochigi-Ken (JP)

( * ) Notice: Subject to any disclaimer, the term of this patent is extended or adjusted under 35 U.S.C. 154(b) by 1669 days.

(21) Appl. No.: 12/295,811

(22) PCT Filed: Apr. 3, 2007

(86) PCT No.: PCT/JP2007/057453
§ 371 (c)(1),
(2), (4) Date: Oct. 2, 2008

(87) PCT Pub. No.: WO2007/116881
PCT Pub. Date: Oct. 18, 2007

(65) Prior Publication Data
US 2009/0173065 A1    Jul. 9, 2009

(30) Foreign Application Priority Data
Apr. 3, 2006    (JP) .................................. 2006-102224

(51) Int. Cl.
*B01J 23/10*    (2006.01)
*F01N 3/10*    (2006.01)
*B01D 53/94*    (2006.01)
(Continued)

(52) U.S. Cl.
CPC ................ *F01N 3/10* (2013.01); *B01D 53/945* (2013.01); *B01D 2255/10* (2013.01); *B01D 2255/2092* (2013.01); *B01D 2255/407* (2013.01); *B01D 2255/9022* (2013.01); *B01D 2255/9025* (2013.01); *B01D 2255/9027* (2013.01); *B01J 23/002* (2013.01); *B01J 23/63* (2013.01); *B01J 35/10* (2013.01); *B01J 35/1014* (2013.01); *B01J 37/0018* (2013.01); *B01J 37/0234* (2013.01); *B01J 37/0244* (2013.01);
(Continued)

(58) Field of Classification Search
CPC ...... B01D 53/945; B01J 23/002; B01J 23/63; B01J 37/0018; B01J 37/0234; B01J 37/0244; B01J 35/10; F01N 3/10
USPC .............. 422/177, 180; 502/304, 327, 527.12
See application file for complete search history.

(56) References Cited

U.S. PATENT DOCUMENTS 3,939,104 A    2/1976    Campbell et al.
4,027,476 A    6/1977    Schmidt
(Continued)

FOREIGN PATENT DOCUMENTS

EP    1 364 706 A1    11/2003
EP    1 832 344 A1    9/2007
(Continued)

*Primary Examiner* — Jill Warden
*Assistant Examiner* — Joye L Woodard
(74) *Attorney, Agent, or Firm* — Kevin M. Carroll

(57) ABSTRACT

An exhaust gas catalyst where the catalyst efficiency is improved by enhancing diffusion of the exhaust gas in a catalyst layer. An exhaust gas catalyst comprises at least a carrier and a plurality of layers formed on the carrier. At least one of the layers has pores therein, and at least one other layer has pores therein and contains, as catalyst components, a noble metal, alumina and a complex oxide mainly containing ceria, zirconia and one or more rare earth elements other than cerium.

18 Claims, 2 Drawing Sheets

(51) Int. Cl.
*B01J 23/00* (2006.01)
*B01J 23/63* (2006.01)
*B01J 35/10* (2006.01)
*B01J 37/00* (2006.01)
*B01J 37/02* (2006.01)

(52) U.S. Cl.
CPC .............. *B01J 2523/00* (2013.01); *Y02T 10/22* (2013.01); *Y10S 502/52712* (2013.01)

(56) References Cited

U.S. PATENT DOCUMENTS

| | | |
|---|---|---|
| 4,426,320 A | 1/1984 | Ernest et al. |
| 4,793,980 A | 12/1988 | Torobin |
| 5,175,136 A | 12/1992 | Felthouse |
| 5,354,720 A | 10/1994 | Leyrer et al. |
| 5,702,675 A | 12/1997 | Takeshima et al. |
| 6,831,036 B1 | 12/2004 | Yamazaki et al. |
| 6,858,563 B2 | 2/2005 | Suzawa et al. |
| 6,887,826 B2 | 5/2005 | Nishimura et al. |
| 6,916,450 B2 | 7/2005 | Akama et al. |
| 6,936,561 B2 | 8/2005 | Marques et al. |
| 6,953,769 B2 | 10/2005 | Yamada et al. |
| 6,956,008 B2 * | 10/2005 | Takeshima et al. ........... 502/326 |
| 7,048,894 B2 | 5/2006 | Tanaka et al. |
| 7,055,314 B2 | 6/2006 | Treiber |
| 7,179,430 B1 | 2/2007 | Stobbe et al. |
| 7,214,643 B2 * | 5/2007 | Yamamoto et al. ........... 502/300 |
| 7,306,771 B2 | 12/2007 | Okawara |
| 7,547,656 B2 | 6/2009 | Miura |
| 7,550,117 B2 | 6/2009 | Alward et al. |
| 7,572,311 B2 | 8/2009 | Zuberi |
| 7,625,529 B2 | 12/2009 | Ohno et al. |
| 7,718,143 B2 | 5/2010 | Ogura |
| 2001/0042440 A1 | 11/2001 | Miyazawa et al. |
| 2003/0176280 A1 | 9/2003 | Caze et al. |
| 2004/0072010 A1 | 4/2004 | Date et al. |
| 2005/0107244 A1 | 5/2005 | Ichikawa et al. |
| 2005/0191199 A1 | 9/2005 | Date et al. |
| 2006/0261004 A1 | 11/2006 | Lockledge et al. |
| 2009/0044521 A1 * | 2/2009 | Cho et al. ........................ 60/299 |

FOREIGN PATENT DOCUMENTS

| | | |
|---|---|---|
| JP | 57-68143 A | 4/1982 |
| JP | 1-13901 * | 3/1989 |
| JP | 9-215922 A | 8/1997 |
| JP | 10-286462 A | 10/1998 |
| JP | 2000-42368 A | 2/2000 |
| JP | 2000-271480 A | 10/2000 |
| JP | 2002-191988 A | 7/2002 |
| JP | 2003-326170 A | 11/2003 |
| JP | 2004-33933 A | 2/2004 |
| JP | 2004-330025 A | 11/2004 |
| WO | WO-2006/040842 A1 | 4/2006 |

* cited by examiner

EXHAUST GAS CATALYST AND EXHAUST GAS PROCESSING APPARATUS USING SAME

CROSS-REFERENCE TO RELATED APPLICATION

This application is the U.S. National Phase application of PCT International Application No. PCT/JP2007/057453, filed Apr. 3, 2007, and claims priority of Japanese Patent Application No. 2006-102224, filed Apr. 3, 2006, both of which are incorporated herein by reference.

FIELD OF THE INVENTION

The present invention relates to an exhaust gas catalyst where multiple layers are formed in a support.

BACKGROUND OF THE INVENTION

Specific examples of internal combustion, especially exhaust gas catalysts for an automobile engine include the following: ternary catalysts that simultaneously process carbon hydride, carbon monoxide and nitrogen oxide (NOx) in the exhaust gas; oxide catalysts that simultaneously process carbon hydride (HC) and carbon monoxide (CO) in the exhaust gas; NOx storage reduction catalysts that store NOx in the exhaust gas when an air-fuel ratio is in a lean state, and reduce & process NOx by switching the air-fuel ratio to a theoretical air fuel ratio or rich state before this NOx becomes saturated; and NOx selective reduction catalysts that reduce & process NOx in the exhaust gas by a reducing agent.

The ternary catalysts, the oxide catalysts, the NOx storage reduction catalysts and the NOx selective reduction catalysts are produced by coating a slurry form of catalytic components in these catalysts to a ceramic honeycomb form support and by sintering this, respectively.

However, because catalytic components are uniformly formed in a support in the most of the conventional exhaust gas catalysts, when the exhaust gas inflows into the exhaust gas catalyst, the gas diffusion speed of the exhaust gas is slow, and as a result, it would often appear that the exhaust gas is not sufficiently processed. Further, in association with the increase in the exhaust gas temperature, heat resistance that is required for the exhaust gas catalyst is increased. However, in the conventional composite oxide, the heat resistance is insufficient and it would often appear that the catalyst performance after the heat treatment could not be sufficiently maintained.

In the meantime, in Japanese Patent Application Laid-Open No. 2002-191988 (Patent Literature 1) and Japanese Patent Application Laid-Open No. 2002-253968 (Patent Literature 2), an NOx storage reduction catalyst where the gas diffuseness of the exhaust gas is enhancement and clarifying efficiency of NOx is improved by supporting noble metal and NOx storing agent to the coating layer made from a porous structure where fine pores having a specific pore diameter are established is proposed. However, in the exhaust gas catalysts, enhancement of the gas diffuseness of the exhaust gas in the layer of the catalytic component and improvement of processing efficiency of the exhaust gas are still in demand.
Patent Literature 1: Japanese Patent Application Laid-Open No. 2002-191988
Patent Literature 2: Japanese Patent Application Laid-Open No. 2002-253968

SUMMARY OF THE INVENTION

The inventors of the present invention discovered the configuration of the exhaust gas catalyst to improve the processing of the exhaust gas at the time of the present invention. Particularly, in a catalyst formed from multiple layers, findings where at least one of the multiple layers has voids showing specific minor axis and major axis, and the processing of the exhaust gas can be improved by including catalytic components having heat resistance were obtained. Therefore, the present invention is based upon the findings. Therefore, the present invention provides an exhaust gas catalyst that can enhance the gas diffuseness of the exhaust gas and improve the processing of the exhaust gas.

Therefore, the exhaust gas catalyst according to the present invention, comprising:
a support and multiple layer formed on the support, wherein at least one of the multiple layers has voids therein; and
at least one of the multiple layers has voids therein and comprises, as catalytic components, a noble metal, alumina, and one or more composite oxides comprising, as main components, ceria, zirconia and one or more rare earth elements except for ceria.

DETAILED DESCRIPTION OF THE INVENTION

Exhaust Gas Catalyst

Figure 1:
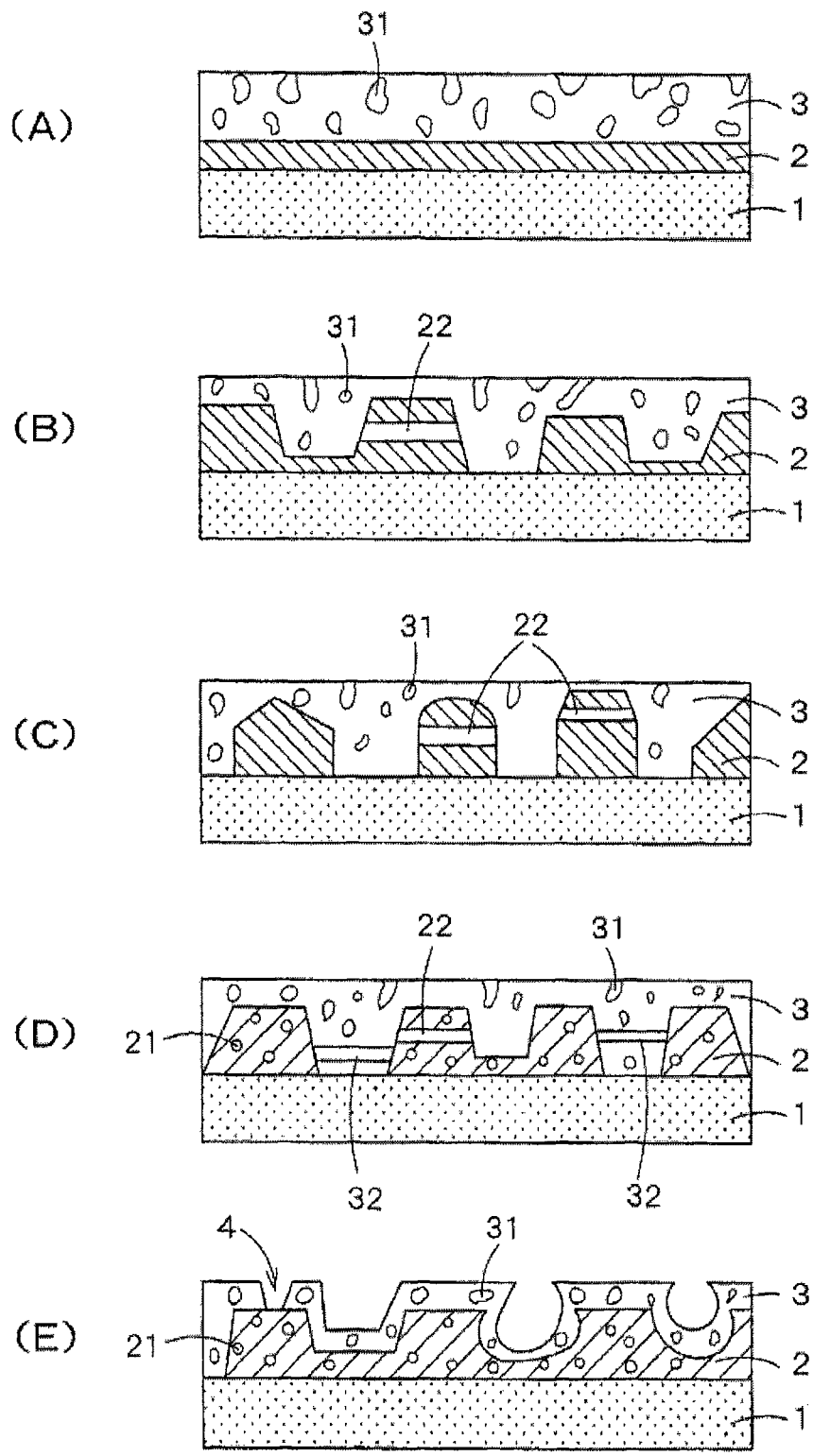
FIGS. 1 (A) to (E) show a schematic diagram of the exhaust gas catalyst according to the invention of the present application, respectively.

The exhaust gas catalyst according to the present application is configured such that at least one of the multiple layers has voids. The present invention is characterized such that at least one of the multiple layers has catalytic components, and, said layer has voids. Herein, "voids" in the layer means that space exists in the layer, and specifically, vacancy, fine pore, tunnel-state (cylinder, prismatic column) slit can be mentioned.
1. Mode The mode of the exhaust gas catalyst according to the present invention will be described with reference to FIG. 1. FIGS. 1 (A) to (E) show a cross sectional view of one mode of the exhaust gas catalyst according to the present invention, respectively. FIG. 1 (A) shows an exhaust gas catalyst where a first layer 2 is formed on a support 1, and a second layer 3 having voids 31 is formed over the first layer 2. FIG. 1 (B) shows an exhaust gas catalyst where the first layer 2 having a penetrating pathway 22 is formed on the support 1 to have an uneven shape, and the second layer 3 having the voids 31 is formed over the first layer 2. FIG. 1 (C) shows an exhaust gas catalyst where the first layer 2 having a penetrating pathway 22 is formed on the support 1 to have a sea-island shape, and the second layer 3 having the voids 31 is formed over the first layer 2. FIG. 1 (D) shows an exhaust gas catalyst where the first layer 2 having voids 21 and the penetrating pathway 22 is formed on the support 1 to have an uneven shape and a sea-island shape, and the second layer 3 having the voids 31 and a penetrating pathway 32 is formed over the first layer 2. FIG. 1 (E) shows an exhaust gas catalyst where the first layer 2 having the voids 21 is formed on the support 1 to have an uneven shape, and the second layer 3 having the voids 31 is formed over the first layer 2. In this exhaust gas catalyst, as shown with the symbol 4 in FIG. 1 (E), the first layer 2 is partially not covered with the second layer 3.

As shown in FIGS. 1 (A) to (E), in the exhaust gas catalyst, the first layer 2 and the second layer 3 are adjacent with each other, and the exhaust gas catalyst has the voids (21 or 31) or the penetrating pathway (22 or 32) in these layers as voids. Then, the first layer 2 and the second layer 3 may have the same or different average void ratio. In this type of exhaust gas catalyst, because the gas diffuseness of the exhaust gas is improved and the contact area of the exhaust gas is expanded, it becomes possible to effectively process the exhaust gas.

In the above-mentioned, regarding the first layer 2 and the second layer 3, at least one of them or both contain catalytic components. Further, the vacancies or the penetrating pathway in the first layer 2 and the second layer 3 are one example of the voids in each layer, respectively, and the present invention shall not be limited to these configurations.

2. Average Diameter of Void

In the present invention, the average diameter of voids is 0.2 μm or more and 500 μm or less, and it is preferable that the lower limit is 0.5 μm or more and the upper limit is 300 μm or less. In the present invention, "average diameter" defines that four times of cross-sectional area of void is divided by an entire perimeter of the cross section. In the present invention, when voids exist at least in one of the multiple layers, an average void ratio of the voids is 5% or more and 80% or less, and it is preferable that the lower limit is 10% or more and the upper limit is 60% or less. According to the preferable mode of the present invention, adjacent layers from each other in the multiple layers may have the same or different average void ratio. In this item, "void" means what exists in the multiple layers themselves, and this shall not include a void, such as a substrate where the multiple layers are supported.

According to a preferable mode of the present invention, the shape of the multiple layers to be formed may be any shape; however, it is preferable to be formed in an uneven shape. Further, according to another preferable mode of the present invention, it is preferable that at least one of the multiple layers is formed to have a sea-island shape in the support. These shapes may be physically formed on the occasion of forming the multiple layers in the support, and it is preferable to be formed by appropriately adjusting the shape and quantity of a forming agent.

The thickness of each layer in the multiple layers is 1 μm or more and 300 μm or less, and it is preferable that the lower limit is 2 μm or more and the upper limit is 280 μm or less, and it is more preferable that the lower limit is 5 μm or more and the upper limit is 250 μm or less.

Formation of Multiple Layers

A specific example of a means to form the multiple layers on the support includes the following: porous structure powder, catalytic components (in the case of forming a catalyst layer) if necessary and a forming agent are added to a solvent (for example, water), and the mixture is agitated and a slurry is prepared. This slurry is attached to a support and baked, and one layer is formed on the support. Next, other slurry is attached to the formed one layer and baked, and another layer is formed to this one layer with the above-mentioned procedures. The exhaust gas catalyst according to the present invention will be prepared by repeating this.

As the forming agent, it is preferable that an agent that is burned at the time of baking or drying and its chemical characteristics shall not remain in the exhaust gas catalyst. As the forming agent, it is preferable that an agent that has thermally-degradable or combustible morphology, such as sphere or cylinder. This specific example includes a foaming agent, a surfactant, an expandable synthetic resin, activated carbon, graphite powder, pulp powder, organic fibers, and plastic fibers. A specific example of the foaming agent includes $La_2(CO_3)_3$, $Al_2(CO)_3$ and $Ce_2(CO)_3$, and compounds containing similar catalytic components are preferable. A specific example of the surfactant includes an anionic surfactant, such as sulfonic acid type or carboxylic acid type, a cationic surfactant, such as amine type, and a zwitterionic surfactant, such as fatty acid ester type. Specific examples of expandable synthetic resin include synthetic resins, such as polyurethane series, polystyrene series, polyethylene series, polyester series or acrylic ester series. Further, the voids are formed not only by the foaming agent but may be formed by a device that can generate uniform size of bubbles (such as microbubbles).

An additive amount of the forming agent 1% by weight or more and 80% by weight with regard to the entire quantity of components in each layer of the multiple layers, and it is preferable that the lower limit is 2% by weight or more and the upper limit is 70% by weight or less, and it is more preferable that the lower limit is 3% by weight or more and the upper limit is 60% by weight or less.

As specific examples of the porous structure powder include aluminum oxide, ceria-zirconia composite oxide, cerium oxide, zirconium oxide, titanium oxide and crystalline zeolite. When at least one of the multiple layers contain catalytic components, the catalytic components can be appropriately selected according to the components in the exhaust gas; however, according to the preferable mode of the present invention, it is preferable to contain ternary catalytic components.

3. Catalytic Components

Composite Oxide

The catalytic components in the present invention contains alumina, ceria, zirconia and one or more types of composite oxides having one or more types of rare earth elements except for ceria (hereafter, it may simply referred to as "composite oxide").

In the present invention, one or more types of the composite oxide are contained. According to the preferable mode of the present invention, in one or more types of composite oxides, it is preferable that a specific surface area of at least one type of composite oxide is 40 $m^2/g$ or more (preferably, 45 $m^2/g$ or more) at 1,000° C. can be maintained. In the present invention, for acquiring the specific surface area of the composite oxide, a sample is heated and left at 1,000° C. of atmosphere for 2 hours, and then, the specific surface area of the sample can be measured using a nitrogen adsorption method. In the present invention, this specific surface area can be utilized as a heat resistance reference.

Further, for the structure of the composite oxide, the one that is stable in either one of single crystal system, a tetragonal single crystal system or a cubic single crystal system, is preferably utilized. In general, it appears that the structure of the composite oxide varies according to the content of ceria. Specifically, it appears that the composite oxide containing a great content of ceria has a cubic crystal system structure, and the composite oxide containing less content of ceria has tetragonal crystal system structure. In the present invention, a composite oxide that stably maintains a single crystal system especially after a heat resistance test is preferable.

According to the preferable embodiment of the present invention, for the composite oxide, when a constituent atom ratio among cerium (Ce), zirconium (Zr), the rare earth elements (R) and oxygen atom (O) is $[1-(x+y)]:x:y:2$, a composite oxide that satisfies all of the following general expressions (I) to (III) are used:

$$0 \text{ (preferably } 0.02) </= [1-(x+y)] < 0.95 \text{ (preferably } 0.85) \quad \text{(I)}$$

$$0.05 \text{ (preferably } 0.13) </= x < 1.0 \text{ (preferably } 0.96) \quad \text{(II)}$$

$$0 \text{ (preferably } 0.02) < y </= 0.5 \text{ (preferably } 0.2) \quad \text{(III)}$$

The additive amount of the composite oxide is 5% by weight or more and 95% by weight or less with respect to total weight of the exhaust gas catalyst, it is preferable that the lower limit is 10% by weight or more and the upper limit is 90% by weight or less, and it is more preferable that the lower limit is 15% by weight or more and the upper limit is 85% by weight or less. Further, according to the preferable embodiment of the present invention, the composition of the composite oxide may be the same or difference in each layer.

According to the preferable embodiment of the present invention, it is preferable that a component weight ratio of alumina to the composite oxide as the catalytic components is approximately 1:9 or more and 9:1 or less, and it is preferable that this is approximately 2:8 or more and 8:2 or less.

Noble Metal

As a noble metal, one or more types of metal belonging to the noble metal group can be used. A specific example of the metal includes platinum, palladium and rhodium, and preferably includes the metal selected from a group platinum, palladium, rhodium and mixture of them. A support amount of the noble metal is 0.001% by weight or more and 10.4% by weight of less with regard to total weight of the exhaust gas catalyst; it is preferable that the lower limit is 0.005% by weight or more and the upper limit is 9.2% by weight; and it is more preferable that the lower limit is 0.01% by weight or more and the upper limit is 8.0% by weight or less.

According to the preferable mode of the present invention, it is preferable that the noble metal is supported on a composite oxide containing alumina or ceria, zirconia and one or more types of rare earth elements except for ceria as primary components.

Rare Earth Elements

As a specific example of the rare earth elements, one or more types selected from scandium (Sc), yttrium (Y), lanthanum (La), praseodymium (Pr), neodymium (Nd), promethium (Pm), samarium (Sm), europium (Eu), gadolinium (Gd), terbium (Td), dysprosium (Dy), holmium (Ho), erbium (Er), thulium (Tm), ytterbium (Yb), lutetium (Lu) except for ceria and mixtures of these are preferably utilized. An additive amount of the rare earth elements is 0.10% by weight or more and 48% by weight or less with respect to total weight of the exhaust gas catalyst, and it is preferable that the lower limit is 0.20% by weight or more and the lower limit is 45% by weight or less, and it is more preferable that the lower limit is 0.3% by weight or more and the upper limit is 43% by weight or less.

Alkali Metal, Alkali Earth Metal and Transition Metal

In the present invention, as the catalytic components, the components further containing one or more types selected from a group of alkali metal, alkali earth metal, transition metal and mixtures of these. A specific example of alkali metal includes a metal selected from a group of lithium (Li), sodium (Na), potassium (K), rubidium (Rb), cesium (Cs), fransium (Fr) and mixtures of these. Specific examples of alkali earth metal include a metal selected from a group of beryllium (Be), magnesium (Mg), calcium (Ca), strontium (Sr), barium (Ba) and mixture of these. Specific examples of transition metal include a metal selected from a group of titanium (Ti), vanadium (V), niobium (Nb), tantalum (Ta), chrome (Cr), molybdenum (Mo), tungsten (W), manganese (Mn), iron (Fe), ruthenium (Ru), iridium (Ir), nickel (Ni), copper (Cu), silver (Ag), gold (Au) and mixture of these.

The additive amounts of alkali metal, alkali earth metal, transition metal and mixtures of these are 0.10% by weight or more and 28.9% by weight with respect to total weight of the exhaust gas catalyst, and it is preferable the lower limit is 0.19% by weight or more and the upper limit is 23.1% by weight, and it is more preferable that the lower limit is 0.29% by weight and the upper limit is 17.4% or less.

Support

Specific examples of the support include a pellet shape (granular shape) made of alumina and a monolith shape (honeycomb shape) made of metal. For example, the support may be made of materials such as cordierite ceramics or stainless steel. Particularly, the monolith shape that excels in heat resistance, resistance to thermal shock and mechanical strength is preferable.

Exhaust Gas Processing Device

Figure 2:
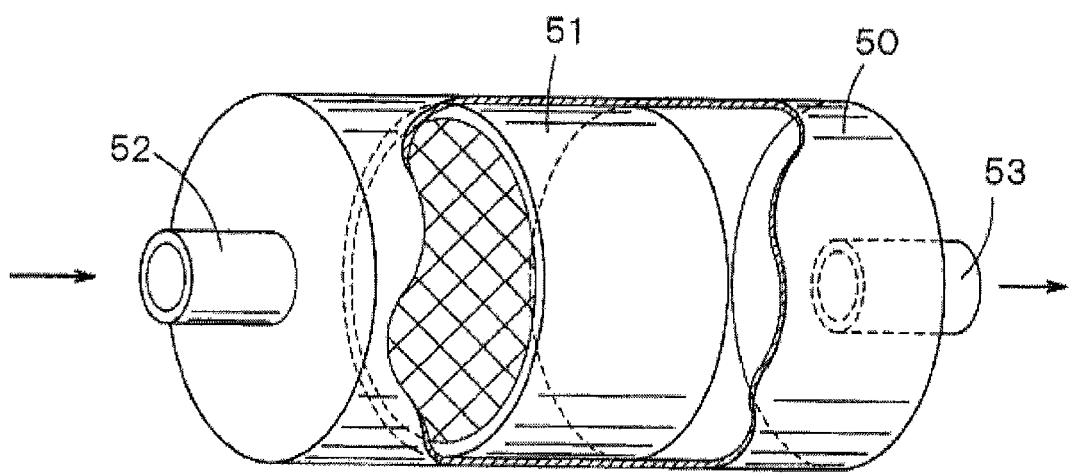
FIG. 2 shows a schematic diagram of an apparatus that treats the exhaust gas according to the invention of the present application.

According to another mode of the present invention, an exhaust gas processing device equipped with the exhaust gas catalyst according to the present invention is provided. The details of the exhaust gas processing device according to the present invention will be described with reference to FIG. 2. FIG. 2 shows a schematic diagram of the exhaust gas processing device equipped with the exhaust gas catalyst according to the present invention. An exhaust gas processing device 50 according to the present invention is configured such that an exhaust gas catalyst 51 is arranged in the device body composed of an exhaust gas inlet 52 and an exhaust gas outlet 53. Exhaust gas flows into the inlet 52, and the exhaust gas is processed by the exhaust gas catalyst 51 according to the present invention.

According to the preferable mode of the present invention, the exhaust gas from the internal combustion flows into the exhaust gas catalyst 51 (ternary catalyst) of the present invention from the exhaust gas inlet 52, and in this exhaust gas catalyst 51, at least one of carbon hydride (HC), carbon monoxide and nitrogen oxide is oxidized or reduced & processed, and the processed exhaust gas is exhausted carbon dioxide, water or nitrogen gas via the output 53. According to the preferable mode of the present invention, it is preferable that one or more exhaust gas catalysts according to the present invention are arranged in the exhaust gas device. When the multiple exhaust gas catalysts are arranged, the catalytic components of the exhaust gas catalysts may be the same or different.

A preferable gas catalyst of the present invention may be configured such that the multiple layers containing the catalytic components are formed with different composition of components at the inlet side (52) and the outlet side (53) of the exhaust gas. In this exhaust gas catalyst, the ratio of the catalytic components at the inlet side to those at the outlet side is approximately from 1:9 to 9:1, and it is preferably 2:8 or more and 8:2 or less.

Use of Exhaust Gas Catalyst/Exhaust Gas Processing Device

The exhaust gas catalyst/exhaust gas processing device according to the present invention are used for purification of exhaust gas.

The exhaust gas catalyst and the exhaust gas processing device according to the present invention are used for an internal combustion, especially an exhaust system (at the exhaust side of exhaust gas) of a spark ignition engine (for example, gasoline engine) or a compression ignition engine (for example, diesel engine). Further, these engines are engines that adjust an air-fuel ratio and burn a fuel, and the preferable specific example includes a lean burn engine, a direct fuel-injection engine, preferably a combination of these (in other words, a direct fuel-injection lean burn engine). The direct fuel-injection engine is an engine that adopts a fuel supply system, which can realize a high compression ratio, improvement of combustion efficiency, and reduction of exhaust gas. Consequently, it becomes possible to further improve the combustion efficiency and reduce exhaust gas by the combination with the lean burn engine.

The exhaust gas catalyst and the exhaust gas processing device according to the present invention are utilized for the exhaust system of the internal combustion loaded in conveying machinery or machinery. Specific examples of the conveying machinery and machinery include, for example, transportation machinery, such as cars, buses, trucks, dump trucks, railway motor cars, motorcycles, motor-assisted bicycles, ship, tankers, motor boats or airplanes; agricultural and forestry industrial machinery, such as cultivators, tractors, combine harvesters, chainsaw or lumber conveyor machinery; fishery and fishing machines, such as fishing boats; construction machinery, such as tank lorry, crane, presser or excavator; and electric generators. The exhaust gas catalyst according to the present invention, for example, in the case of the exhaust system for vehicles, can be arranged as a start catalyst, an under floor, or a manifold converter.

EMBODIMENT

The details of the present invention will be described in further detail according to embodiment. However, the details of the present invention shall not be limitedly interpreted because of the embodiments.

EXAMPLES

Preparation of Exhaust Gas Catalyst

Example 1

Mixing of 20 parts by weight of $\gamma$-$Al_2O_3$ powder, 30 parts by weight of ceria-zirconia composite oxide powder containing neodymium and lanthanum as rare earth elements, 5 parts by weight of barium hydroxide, 60 parts by weight of water and a palladium nitrate solution was conducted. Then, the mixture was stirred by a high-speed stirrer (manufactured by Silverson Machines, Inc.) in the atmosphere for 30 minutes, and slurry whose catalytic components were uniformly dispersed was obtained. Next, a honeycomb base material made of cordierite (volume: 713 cc, 600 cells/in$^2$: manufactured by NGK Insulators, Ltd.) was prepared, and the slurry was coated to the base material, and after excess slurry was blown away, the base material was baked at 500° C. in the atmosphere for 1 hour and the first layer was laminated.

Mixing of 10 parts by weight of $\gamma$-$Al_2O_3$ powder, 10 parts by weight of ceria-zirconia composite oxide powder containing neodymium as rare earth elements, 50 parts by weight of water, a platinum nitrate solution and a rhodium nitrate solution was conducted, and the mixture was stirred by the high-speed stirrer in the atmosphere for 30 minutes, and slurry whose catalytic components were uniformly dispersed was obtained. Next, this slurry was coated on a honeycomb base material where the first layer was formed, and after excess slurry was blown away, the base material was baked at 500° C. in the atmosphere for 1 hour and the second layer was laminated and an exhaust gas catalyst (ternary catalyst) was obtained.

In this exhaust gas catalyst, a support amount of Pt (platinum) and Rh (rhodium) was 0.24 per L of honeycomb base material, and the support amount of Pd (palladium) was 1.3 g. Further, a surface area of the composite oxide used for the first layer after a heat treatment in the atmosphere at 1000° C. for 2 hours was 48 m$^2$/g, and a surface area of a composite oxide used for the second layer was 46 m$^2$/g.

Comparative Example 1

An exhaust gas catalyst was obtained as similar to Example 1, except for using a ceria-zirconia composite oxide not containing rare earth elements for the first layer and the second layer, and forming with 0.1 g of the support amount of Pt (platinum) and Rh (rhodium) per 1 L of honeycomb base material, and 1.6 g of the support amount of Pd (palladium). Further, the surface area of the composite oxide used for the first layer after the thermal treatment at 1,000° C. for 2 hours in the atmosphere was 22 m$^2$/g, and the surface area of the composite oxide used for the second layer was 22 m$^2$/g.

Evaluation Test 1

Samples having a notch with 25.4 mm of diameter and 81.2 mm of length from the catalysts of Example 1 and Comparative example 1 were arranged within a test device (Horiba, Ltd.) having exhaust inlet & outlet, respectively. Rich composition gas and lean composition gas shown in Table 1 were flowed into this device from the inlet, alternately at every 3 minutes at each gas temperature (900° C., 1,000° C. and 1,100° C.), and a heat treatment was conducted for 20 hours. After this, rich composition gas and lean composition gas shown in Table 2 were flowed into this device from the inlet at 1 Hz, respectively, a purification efficiency of CO and NOx was measured. For the measurement, the gas temperature was raised from 100° C. to 500° C. at 25° C./min, and a purification efficiency of CO and NOx at 400° C. was shown in Table 3. The symbol (%) in Table 1 and Table 2 means volume %. Further, the purification efficiency was calculated in accordance with the following expression:

Purification efficiency(%)={1−(each gas concentration after passage of catalyst/each gas concentration before passage of catalyst)}×100

TABLE 1

|  | $H_2$ | CO | $O_2$ | $H_2O$ |
|---|---|---|---|---|
| Rich | 3% | 3% | — | 10% |
| Lean | — | — | 3% | 10% |

TABLE 2

|  | $C_3H_6$ ppmC | $O_2$ % | NO ppm | CO % | $H_2$ % | $CO_2$ % | $H_2O$ % | $N_2$ % |
|---|---|---|---|---|---|---|---|---|
| Rich | 1200 | 0.50 | 500 | 2.11 | 0.70 | 14.0 | 10 | balance |
| Lean | 1200 | 1.54 | 500 | 0.50 | 0.17 | 14.0 | 10 | balance |

TABLE 3

| Purification efficiency at 400 degrees C. (%) | | | | |
|---|---|---|---|---|
| Heat treatment | Example 1 | | Comparative Example 1 | |
| condition | CO | NOx | CO | NOx |
| 900° C. × 20 h | 98.9 | 98.2 | 98.6 | 98.0 |
| 1000° C. × 20 h | 98.5 | 98.0 | 98.0 | 97.1 |
| 1100° C. × 20 h | 95.8 | 96.2 | 65.7 | 70.9 |

Preparation of Exhaust Gas Catalyst

Example 2

Mixing of 14 parts by weight of $\gamma$-$Al_2O_3$ powder, 24 parts by weight of ceria-zirconia composite oxide powder containing lanthanum as rare earth elements, 5 parts by weight of barium hydroxide, 40 parts by weight of water, a platinum nitrate solution and a palladium nitrate solution was conducted. Then, the mixture was stirred by a high-speed stirrer (manufactured by Silverson Machines, Inc.) in the atmosphere for 30 minutes, and slurry whose catalytic components were uniformly dispersed was obtained. Next, a honeycomb base material made of cordierite (volume: 1,150 cc, 600 cells/in$^2$: manufactured by NGK Insulators, Ltd.) was prepared, and the slurry was coated to the base material, and after excess slurry was blown away, the base material was baked at 500° C. in the atmosphere for 1 hour and the first layer was laminated.

Mixing of 8 parts by weight of γ-Al$_2$O$_3$ powder, 24 parts by weight of ceria-zirconia composite oxide powder containing neodymium and neodymium as rare earth elements, 75 parts by weight of water and rhodium nitrate solution was conducted, and the mixture was stirred by the high-speed stirrer in the atmosphere for 30 minutes, and slurry whose catalytic components were uniformly disperse was obtained. Next, this slurry was coated on a honeycomb base material where the first layer was formed, and after excess slurry was blown away, the base material was baked at 500° C. in the atmosphere for 1 hour and the second layer was laminated and an exhaust gas catalyst (ternary catalyst) was obtained.

In this exhaust gas catalyst, a support amount of Pt (platinum) was 0.52 per L of honeycomb base material, and the support amount of Pd (palladium) was 2.42 g, and the support amount of Rh (rhodium) was 0.35 g. Further, a surface area of the composite oxide used for the first layer after a heat treatment in the atmosphere at 1000° C. for 2 hours was 44 m$^2$/g, and a surface area of a composite oxide used for the second layer was 48 m$^2$/g.

Comparative Example 2

An exhaust gas catalyst was obtained as similar to Example 2, except for using a ceria-zirconia composite oxide not using rare earth elements for the first layer. Further, the surface area of the composite oxide used for the first layer after the thermal treatment at 1,000° C. for 2 hours in the atmosphere was 22 m$^2$/g.

Evaluation Test 2

The catalysts for exhaust gas purification obtained in Example 2 and Comparative example 2 were arranged in the exhaust system of the 4,000-cc gas engine, respectively, and the samples were left standing at 950° C. of temperature within catalytic bed for 150 hours.

Then, each catalyst was stored in a cylindrical body with 15 cm of diameter and 40 cm of length, and the cylindrical body was mounted to a bench of 2.4-L gas engine, and a regular gasoline fuel was burned and a light-off test was conducted. Temperature T50 (° C.) when a purification efficiency of HC, CO and NOx reached 50% at the time of maintaining A/F at 14.35 and increasing gas flowing-in temperature into a catalyst from 100° C. to 400° C. was measured. For the evaluation device, trade name: "MEXA9500" (manufactured by Horiba, Ltd.) was used. The evaluation results are as shown in Table 4, and the smaller numerical numbers became, the higher the exhaust gas purification capacity becomes.

TABLE 4

| | T50 (° C.) | | |
|---|---|---|---|
| | HC | CO | NOx |
| Example 2 | 296 | 294 | 280 |
| Comparative example 2 | 306 | 301 | 288 |

Example 3

Mixing of 30 parts by weight of γ-Al$_2$O$_3$ powder, 16 parts by weight of ceria-zirconia composite oxide powder not containing rare earth elements, 5 parts by weight of barium hydroxide, 50 parts by weight of water and a palladium nitrate solution was conducted, and acrylic resin [resin whose average diameter was approximately 4 μm to 7 μm (approximately 5 μm in average) was used] was further blended so as to be 15% by weight of the entire weight. Then, the mixture was stirred by a high-speed stirrer (manufactured by Silverson Machines, Inc.) in the atmosphere for 30 minutes, and slurry where a forming agent was uniformly dispersed was obtained. Next, a honeycomb base material made of cordierite (volume: 635 cc, 900 cells/in$^2$: manufactured by Corning Incorporated) was prepared, and the slurry was coated to the base material, and after excess slurry was blown away, the base material was baked at 500° C. in the atmosphere for 1 hour and the first layer was laminated.

Mixing of 10 parts by weight of γ-Al$_2$O$_3$ powder, 10 parts by weight of ceria-zirconia composite oxide powder containing lanthanum and neodymium as additives, 40 parts by weight of water and a rhodium nitrate solution was conducted, and acrylic resin [resin whose average diameter was approximately 4 μm to 7 μm (approximately 5 μm in average) was used] was further blended so as to be 15% by weight of the entire weight, and the mixture was stirred by a high-speed stirrer (manufactured by Silverson Machines, Inc.) in the atmosphere for 30 minutes, and slurry where a forming agent was uniformly dispersed was obtained. Next, this slurry was coated on a honeycomb base material where the first layer was formed, and after excess slurry was blown away, the base material was baked at 500° C. in the atmosphere for 1 hour and the second layer was laminated and an exhaust gas catalyst (ternary catalyst) was obtained.

In this exhaust gas catalyst, a support amount of Pd (palladium) was 0.83 per L of honeycomb base substrate, and the support amount of Rh (rhodium) was 0.17 g.

Further, a surface area of the composite oxide used for the first layer after a heat treatment in the atmosphere at 1,000° C. for 2 hours was 22 m$^2$/g, and a surface area of a composite oxide used for the second layer was 43 m$^2$/g.

Comparative Example 3

An exhaust gas catalyst was obtained as similar to Example 3 except for forming the first layer and the second layer without adding a forming agent.

Evaluation Test 3

The catalysts for exhaust gas purification obtained in Example 3 and Comparative example 3 were stored in a catalyst storage can, respectively, and the catalyst storage can was mounted in the exhaust system of 4,000-cc gas engine, and they were left standing at 830° C. of temperature within catalytic bed for 100 hours.

Then, each catalyst was stored in a cylinder body with 15 cm of diameter and 40 cm of length, and the cylinder body was mounted to a bench of 2.4-L gas engine, and a regular gasoline fuel was burned and an A/F characteristic evaluation was conducted. The gas temperature flowing into a catalyst was 400° C., 500° C. and 600° C., and a cross-purification efficiency (highest purification efficiency) (%) of HC—NOx and CO—NOx at the time of changing A/F was measured. For the evaluation device, trade name: "MEXA9500" (manufactured by Horiba, Ltd.) was used. The evaluation results are as shown in Table 5, and the greater numerical numbers became, the higher the exhaust gas purification capacity becomes. The purification efficiency of each component, HC, CO and NOx, was changed in association with the change of A/F; however, the purification efficiency with A/F indicating the highest purification efficiency with each other was regarded as a cross-purification efficiency.

TABLE 5

|  | HC—NOx | CO—NOx |
|---|---|---|
| Purification efficiency at 400 degrees C. (%) | | |
| Example 3 | 88.6 | 97.2 |
| Comparative example 3 | 84.8 | 93.2 |
| Purification efficiency at 500 degrees C. (%) | | |
| Example 3 | 93.9 | 96.9 |
| Comparative example 3 | 91.3 | 92.3 |
| Purification efficiency at 600 degrees C. (%) | | |
| Example 3 | 95.0 | 97.1 |
| Comparative example 3 | 90.0 | 90.4 |

Example 4

Mixing of 15 parts by weight of $\gamma$-$Al_2O_3$ powder, 15 parts by weight of ceria-zirconia composite oxide powder containing lanthanum and yttrium as rare earth elements, 5 parts by weight of barium hydroxide, 50 parts by weight of water and a palladium nitrate solution was conducted, and acrylic resin [resin whose average diameter was approximately 4 μm to 7 μm (approximately 5 μm in average) was used] was further blended so as to be 7% by weight of the entire weight. Then, the mixture was stirred by a high-speed stirrer (manufactured by Silverson Machines, Inc.) in the atmosphere for 30 minutes, and slurry where a forming agent was uniformly dispersed was obtained. Next, a honeycomb base material made of cordierite (volume: 1,003 cc, 400 cells/in$^2$: manufactured by NGK Insulators, Ltd.) was prepared, and the slurry was coated to the base material, and after excess slurry was blown away, the base material was baked at 500° C. in the atmosphere for 1 hour and the first layer was laminated.

Mixing of 10 parts by weight of $\gamma$-$Al_2O_3$ powder, 10 parts by weight of ceria-zirconia composite oxide powder containing lanthanum and neodymium as additives, 45 parts by weight of water and a rhodium nitrate solution was conducted, and the mixture was stirred by a high-speed stirrer in the atmosphere for 30 minutes, and slurry was obtained. Next, this slurry was coated on a honeycomb base material where the first layer was formed, and after excess slurry was blown away, the base material was baked at 500° C. in the atmosphere for 1 hour and the second layer was laminated and an exhaust gas catalyst (ternary catalyst) was obtained.

In this exhaust gas catalyst, a support amount of Pd (palladium) was 0.59 per L of honeycomb base substrate, and the support amount of Rh (rhodium) was 0.12 g. Further, a surface area of the composite oxide used for the first layer after a heat treatment in the atmosphere at 1,000° C. for 2 hours was 52 m$^2$/g, and a surface area of a composite oxide used for the second layer was 43 m$^2$/g.

Example 5

Mixing of 15 parts by weight of $\gamma$-$Al_2O_3$ powder, 15 parts by weight of ceria-zirconia composite oxide powder containing lanthanum and yttrium as rare earth elements, 5 parts by weight of barium hydroxide, 50 parts by weight of water and a palladium nitrate solution was conducted, and the mixture was stirred by a high-speed stirrer (manufactured by Silverson Machines, Inc.) in the atmosphere for 30 minutes, and slurry was obtained. Next, a honeycomb base material made of cordierite (volume: 1,003 cc, 400 cells/in$^2$: manufactured by NGK Insulators, Ltd.) was prepared, and the slurry was coated to the base material, and after excess slurry was blown away, the base material was baked at 500° C. in the atmosphere for 1 hour and the first layer was laminated.

Mixing of 10 parts by weight of $\gamma$-$Al_2O_3$ powder, 10 parts by weight of ceria-zirconia composite oxide powder containing lanthanum and neodymium as additives, 45 parts by weight of water and a rhodium nitrate solution was conducted, and acrylic resin [resin whose average diameter was approximately 4 μm to 7 μm (approximately 5 μm in average) was used] was further blended so as to be 6% by weight of the entire weight, and the mixture was stirred by a high-speed stirrer (manufactured by Silverson Machines, Inc.) in the atmosphere for 30 minutes, and slurry where a forming agent was uniformly dispersed was obtained. Next, this slurry was coated on a honeycomb base material where the first layer was formed, and after excess slurry was blown away, the base material was baked at 500° C. in the atmosphere for 1 hour and the second layer was laminated and an exhaust gas catalyst (ternary catalyst) was obtained.

In this exhaust gas catalyst, a support amount of Pd (palladium) was 0.59 per L of honeycomb base substrate, and the support amount of Rh (rhodium) was 0.12 g. Further, a surface area of the composite oxide used for the first layer after a heat treatment in the atmosphere at 1,000° C. for 2 hours was 52 m$^2$/g, and a surface area of a composite oxide used for the second layer was 43 m$^2$/g.

Comparative Example 4

An exhaust gas catalyst was obtained as similar to Example 4 and Example 5 except for forming the first layer and the second layer without adding a forming agent.

Evaluation Test 4

The catalysts for exhaust gas purification obtained in Example 4, Example 5 and Comparative example 4 were stored in a catalyst storage can, respectively, and the catalyst storage can was mounted in the exhaust system of 4,000-cc gas engine, and they were left standing at 950° C. of temperature within catalytic bed for 96 hours.

Then, each catalyst was stored in a cylinder body with 11.6 cm of diameter and 21.0 cm of length, and the cylinder body was mounted to a bench of 2.4-L gas engine, and a regular gasoline fuel was burned and an A/F characteristic evaluation was conducted. The gas temperature flowing into a catalyst was 500° C., 600° C. and 700° C., and a purification efficiency (%) of HC, CO and NOx at the time of changing A/F was measured. For the evaluation device, trade name: "MEXA9500" (manufactured by Horiba, Ltd.) was used. The evaluation results are as shown in Table 6, and the greater numerical numbers became, the higher the exhaust gas purification capacity becomes. Further, the purification efficiency of each component was calculated in accordance with the following expression:

Purification efficiency(%)={1−(each gas concentration after passage of catalyst/each gas concentration before passage of catalyst)}×100

TABLE 6

|  | HC—NOx | CO—NOx |
| --- | --- | --- |
| Purification efficiency at 500 degrees C. (%) | | |
| Example 4 | 74.0 | 76.6 |
| Example 5 | 74.0 | 78.0 |
| Comparative example 4 | 72.0 | 73.6 |
| Purification efficiency at 600 degrees C. (%) | | |
| Example 4 | 79.3 | 79.1 |
| Example 5 | 79.0 | 78.7 |
| Comparative example 4 | 77.4 | 76.1 |
| Purification efficiency at 700 degrees C. (%) | | |
| Example 4 | 79.3 | 80.0 |
| Example 5 | 77.5 | 77.4 |
| Comparative example 4 | 72.0 | 71.3 |

The invention claimed is:

1. An exhaust gas catalyst comprising at least a support and multiple layers formed on the support, wherein
at least one of the multiple layers has voids therein formed via a forming agent; and
the at least one of the multiple layers having voids therein comprises, as catalytic components, a noble metal, alumina, and one or more composite oxides comprising, as main components, ceria, zirconia and one or more rare earth elements except for ceria, wherein the average diameter of the voids ranges from not less than 0.2 μm to not more than 500 μm and the one or more composite oxides has a specific surface area, after a heat treatment at 1000° C. for 2 hours, of not less than 40 m²/g.

2. A catalyst according to claim 1, wherein the at least one of the multiple layers having voids therein has an average void ratio of the layer from not less than 5% to not more than 80%.

3. A catalyst according to claim 1, wherein adjacent layers of the multiple layers having voids each have average void ratios that are the same or are different.

4. A catalyst according to claim 1, wherein the lowermost layer in the multiple layers is formed on the support in an uneven shape or a sea-island shape.

5. A catalyst according to claim 1, wherein the structures of the one or more composite oxides are stable in either a tetragonal single crystal system or a cubic single crystal system.

6. A catalyst according to claim 1, wherein the component weight ratio between the alumina and the composite oxides ranges from not less than 1:9 to not more than 9:1.

7. A catalyst according to claim 1, wherein the compositions of the composite oxides are the same or different in the respective layers.

8. A catalyst according to claim 1, wherein the noble metal is one or more metals belonging to the noble metal group.

9. A catalyst according to claim 1, wherein the noble metal is supported on the alumina or the composite oxides.

10. A catalyst according to claim 1, wherein the rare earth element is one or more elements selected from the group consisting of scandium (Sc), yttrium (Y), lanthanum (La), praseodymium (Pr), neodymium (Nd), promethium (Pm), samarium (Sm), europium (Eu), gadolinium (Gd), terbium (Td), dysprosium (Dy), holmium (Ho), erbium (Er), thulium (Tm), ytterbium (Yb), lutetium (Lu) and mixtures thereof except for ceria.

11. A catalyst according to claim 1, further comprising, as the catalytic components, one or more metals selected from the group consisting of alkali metals, alkali earth metals, transition metals and mixtures thereof.

12. A catalyst according to claim 1, further comprising an inlet side composition and an outlet side composition with each composition comprising the at least one of the multiple layers, wherein the at least one of the multiple layers of the inlet side composition and the at least one of the multiple layers of the outlet side composition comprise different catalytic components respectively.

13. A catalyst according to claim 12, wherein a ratio of the catalytic components of the inlet side composition and the outlet side composition is from 1:9 to 9:1.

14. A catalyst according to claim 1, wherein the catalyst is a spark ignition engine catalyst or a compression ignition engine catalyst.

15. An exhaust gas apparatus, comprising one or more exhaust gas catalysts disposed within the apparatus and downstream of an exhaust gas discharged from the engine, wherein the one or more exhaust gas catalysts comprises at least a support and multiple layers formed on the support, wherein
at least one of the multiple layers has voids therein formed via a forming agent; and
the at least one of the multiple layers having voids therein comprises, as catalytic components, a noble metal, alumina, and one or more composite oxides comprising, as main components, ceria, zirconia and one or more rare earth elements except for ceria, wherein the average diameter of the voids ranges from not less than 0.2 μm to not more than 500 μm and the one or more composite oxides has a specific surface area, after a heat treatment at 1000° C. for 2 hours, of not less than 40 m²/g.

16. An apparatus according to claim 15, wherein, in the case where the plurality of exhaust gas catalysts are disposed, the catalytic components of the exhaust gas catalysts are the same or different.

17. An apparatus for treating hydrocarbons, carbon monoxide or nitrogen oxides in the exhaust gas, said apparatus comprising one or more exhaust gas catalysts for oxidizing or reducing the hydrocarbons, carbon monoxide or nitrogen oxides in the exhaust gas into carbon dioxide, water or nitrogen gas, wherein the one or more exhaust gas catalysts comprises at least a support and multiple layers formed on the support, wherein
at least one of the multiple layers has voids therein formed via a forming agent; and
the at least one of the multiple layers having voids therein comprises, as catalytic components, a noble metal, alumina, and one or more composite oxides comprising, as main components, ceria, zirconia and one or more rare earth elements except for ceria, wherein the average diameter of the voids ranges from not less than 0.2 μm to not more than 500 μm and the one or more composite oxides has a specific surface area, after a heat treatment at 1000° C. for 2 hours, of not less than 40 m²/g.

18. An apparatus according to claim 17, wherein the apparatus is at an exhaust gas side of a spark ignition engine or a compression ignition engine.

* * * * *